(12) United States Patent
Li

(10) Patent No.: US 7,261,255 B2
(45) Date of Patent: Aug. 28, 2007

(54) TRANSFORMABLE AIRSHIP

(76) Inventor: Hiu Yeung Li, 1/F, Block G, Huasheng Industrial Area Wanzai, Zhuhai (CN)

( * ) Notice: Subject to any disclaimer, the term of this patent is extended or adjusted under 35 U.S.C. 154(b) by 0 days.

(21) Appl. No.: 11/327,868

(22) Filed: Jan. 9, 2006

(65) Prior Publication Data

US 2007/0034740 A1 Feb. 15, 2007

(30) Foreign Application Priority Data

Aug. 12, 2005 (CN) .......................... 200510090070

(51) Int. Cl.
B64B 1/02 (2006.01)
(52) U.S. Cl. ........................... 244/125; 244/30; 244/29
(58) Field of Classification Search ................. 244/29, 244/30, 125, 126, 128, 25–28
See application file for complete search history.

(56) References Cited

U.S. PATENT DOCUMENTS 1,007,405 A * 10/1911 Wagner et al. .............. 244/125
6,642,106 B1 11/2003 Yang et al. .................. 438/257
7,150,430 B2 * 12/2006 Silansky et al. ............... 244/30
7,156,342 B2 * 1/2007 Heaven et al. ................ 244/30
2002/0005457 A1 * 1/2002 Lee et al. ...................... 244/30
2004/0021037 A1 * 2/2004 Nachbar et al. ............. 244/125
2004/0038468 A1 2/2004 Hwang et al. ............... 438/197
2004/0126998 A1 7/2004 Feudel et al. ................ 438/514
2004/0173815 A1 9/2004 Yeo et al. .................... 257/192
2005/0017309 A1 1/2005 Weber et al. ................ 257/376
2005/0029560 A1 2/2005 Wasshuber et al. ......... 257/288

* cited by examiner

Primary Examiner—J. Woodrow Eldred
(74) Attorney, Agent, or Firm—Allen, Dyer, Doppelt, Milbrath & Gilchrist, P.A.

(57) ABSTRACT

The present invention provides a solar-powered transformable airship, on which solar cell panels are installed all over to maximize the amount of solar energy collected. Moreover, the airship according to the present invention has a main body of variable volume, suitable for any altitude, ranging from the ground to 30 kilometers high, providing very good economic potential.

15 Claims, 9 Drawing Sheets

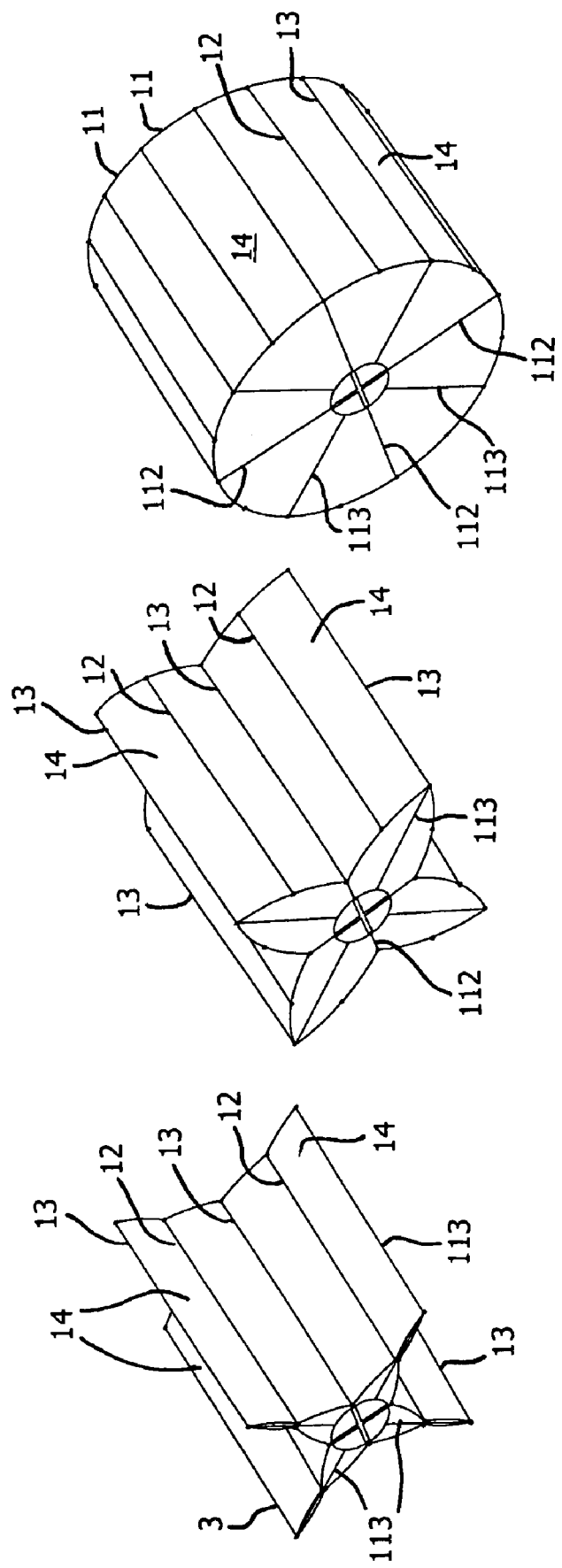

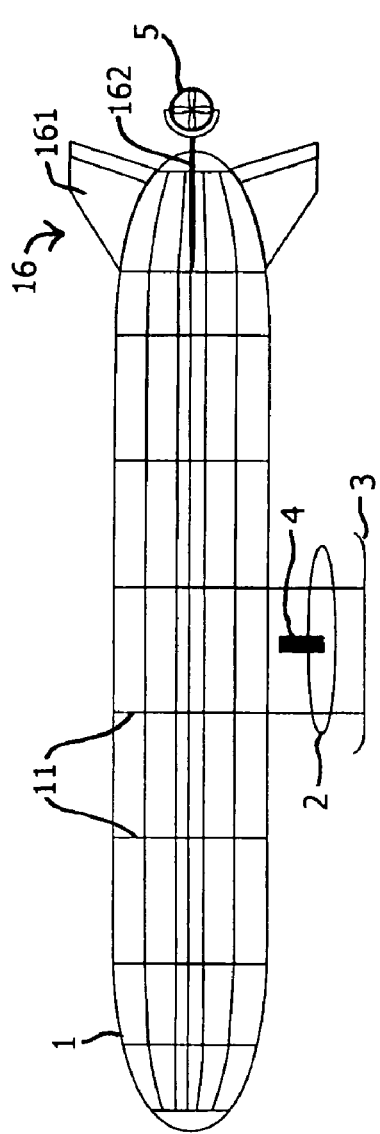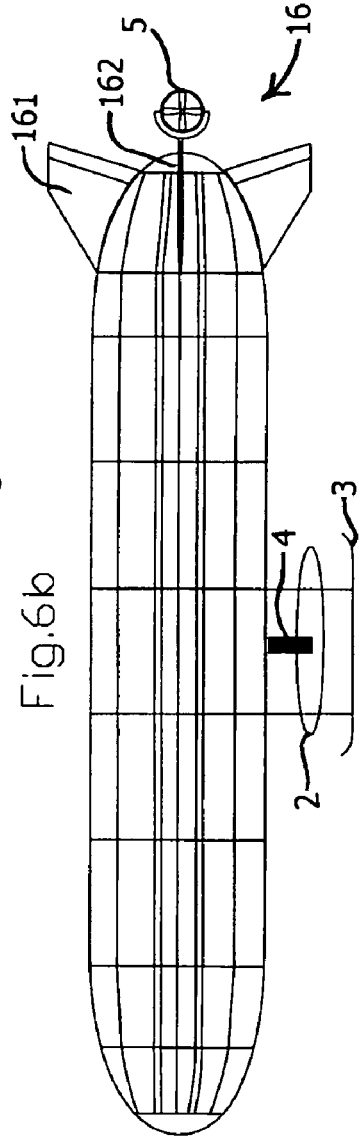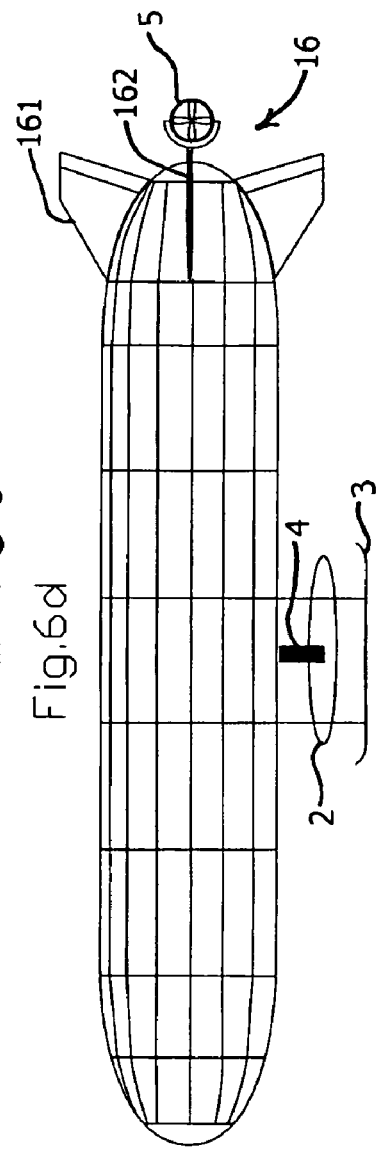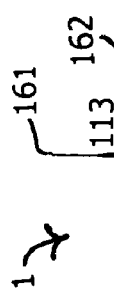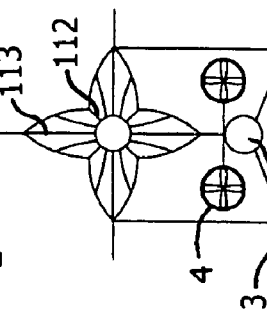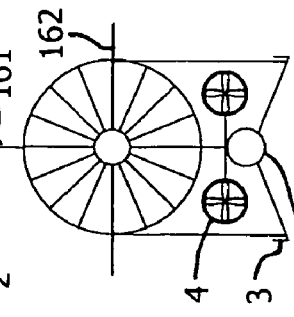

TRANSFORMABLE AIRSHIP

CROSS-REFERENCE TO RELATED APPLICATION

This application claims priority of CN Patent Application No. 200510090070.1 filed on Aug. 12, 2005, entitled "Transformable Airship", which is incorporated herein by reference for all purposes.

TECHNICAL FIELD

The present invention relates to a transformable aircraft, and in particular, to an airship having a main body of variable volume, which can be powered by solar-energy.

BACKGROUND OF THE INVENTION

An airplane, which is a "heavier-than-air" craft, is urged upwardly by a force generated by the relative movement between the airfoils and the airflow, while an airship, which is a "lighter-than-air" craft, makes use of buoyancy to "float" in the air, by filling the airship with a gas having specific gravity less than that of the air. An airship has many merits, which are impossible for an airplane or a helicopter, such as low fuel consumption, long term continuous flight, large payload, less noise pollution, calm flight, simple areas for take-off and landing, etc. Modern airships can fly in the air with little power, are relatively quiet, and do not generate turbulence. Moreover, modern airships can stay in the air for a long time, being able to suspend in a certain place for several days or even weeks. All of these illustrate the major advantages of an airship. Since velocity is not necessary for generating the upward force for an airship, a massive amount of energy can be saved. Nowadays, non-renewable resources are becoming scarcer, and the shortage of energy sources has become a threat to mankind. Accordingly, the use of an airship, which needs less energy than other aircrafts, will serve mankind for today and tomorrow. However, among various kinds of modern airships developed by different countries in the world, conventional rigid, semi-rigid or blimp designs are still adopted. Thus, it is difficult to avoid notable problems in these airships, such as, a need to provide a heavy-weight (water, sandbag, compressed air), which has to be increased or decreased to change altitude; the need to change the volume of an airship as the altitude is increased; slow velocity; poor wind resistance; relatively high effect-cost ratio even when an airship can carry out versatile tasks; and the difficulty for an airship to become balanced and level off when suspended in the air. Furthermore, since an airship designed for a certain altitude is only suitable for this specific altitude, different kinds of airships have to be designed for different altitudes, thereby making the use of airships costly. At the same time, the areas where solar cells can be installed on their exterior surface are quite limited for an airship adopting a semi-rigid or blimp design. Accordingly, when the incident angle of sunshine changes, solar cell panels may not be irradiated or sufficiently irradiated, thereby making it impossible to make full use of solar energy.

SUMMARY OF THE INVENTION

The main object of the present invention is to provide a new type of transformable airship, wherein solar cells can be installed in many different areas on the outer shell, thereby maximizing the amount of solar energy collected. Moreover, the airship, according to the present invention, is suitable for any altitude, ranging from the ground to 30 kilometers, thus it has a very good economic potential.

In accordance with the invention, there is provided a transformable airship, comprising:

an airship frame, including longitudinal frames and radial frames; wherein said radial frames are axially symmetrical about a longitudinal central axis and extendable and retractable along a radial direction;

an airship shell mounted on said airship frame, comprising multiple sections of skins of rigid or weak elastic materials, each of said skins is connected with an adjacent skin, forming an envelop on said airship frame; wherein each section of said skins has a planar or curved shape, and is connected with a radially adjacent section of skins by hinge;

buoyant gas storing and discharging apparatus, which is installed inside the airship shell;

a control system including an operation control system and a transformation control system, wherein under the control of the transformation control system, when buoyancy is to be increased, buoyant gas is discharged by the buoyant gas storing and discharging apparatus, and since the air pressure inside the airship is greater than that outside the airship, the pressure difference on the skins generates an outwards force to expand the airship shell, at the same time said radial frame is pulled and extended outwardly in the radial direction, axially symmetrically about said longitudinal central axis, and the airship frame's radial cross-section is enlarged; when buoyancy is to be decreased, the buoyant gas is compressed into the buoyant gas storing and discharging apparatus, since the air pressure inside the airship is less than that outside the airship, the pressure difference on the skins generates an inwards force to contract the airship shell, at the same time said radial frame is contracted inwardly in the radial direction and the radial cross-section of the airship frame is reduced.

On account of the above-described technical scheme, the present invention has advantages and effects as follows:

1. In accordance with the invention, the variation of the volume of the airship can be controlled by coordination of the transformation control system of the airship and the built-in buoyant gas storing and discharging apparatus. Thus, without change of the deadweight of the airship, the volume of the airship is determined based on the air density at a certain altitude, so that the airship can suspend or cruise in the specific altitude. Therefore, the application range and working capability of the airship are increased effectively.

2. Since the buoyancy of the airship of the present invention can be changed by 6-8 times, the airship has the transportation capability in vertical direction of the space. Because, if it is loaded on the ground at its smallest volume, as the airship is expanded in volume, it will rise continuously because of the increased buoyancy, and it will not stop rising until the buoyancy force balances with the force of gravity at a certain altitude.

3. The airship of the present invention has relatively faster speed and better flexibility in the medium and low altitudes, because the volume of the airship is reduced at the medium and low altitudes, and its cross-sectional area is also reduced accordingly, so that the wind resistance is relatively small. This advantage is very important for the performance and working efficiency of an airship.

4. In accordance with the airship of the present invention, solar cell panels can be mounted on almost all of the areas on the surface of the airship shell, enabling the geometry of the airship to be varied when it is necessary to change the buoyancy. Thus, the solar energy can be continuously obtained over the surface area of the airship shell (for example, from solar direct ray, solar side ray, and solar ray reflected by clouds, from any direction of the space), so that the round-trip flight time can be prolonged significantly. If equipped with a solar energy exchange system and fuel cell, the airship of this invention will be able to perform tasks at a certain altitude for a long time without an additional energy source. This feature has notable significance and importance for people living in parts of the world where non-renewable resources are scarce, and the shortage of energy source has become problematic.

BRIEF DESCRIPTION OF THE DRAWINGS

Further features and advantages of the present invention will become apparent from the following detailed description, in combination with the appended drawings, in which:

FIGS. 5a, 5b, and 5c are isometric views showing the varying shape of the skins and the frames of the airship in accordance with the first embodiment of the present invention;

FIGS. 6a, 6b, 6c, 6d, 6e, and 6f are schematic views showing the respective front and side views of the airship when the volume of the airship is the least, medium and the largest, in accordance with the first embodiment of the present invention;

DETAILED DESCRIPTION OF THE PREFERRED EMBODIMENT

As illustrated in FIGS. 1 to 6f, a first embodiment of the solar-powered transformable airship of the present invention includes: an airship shell 1, the longitudinal central axis of which is in horizontal direction; an equipment cabin 2, skis 3 and a pair of main propellers 4, which are located under the airship shell 1. The solar-powered transformable airship also includes a solar energy apparatus and a control system.

Figure 1:
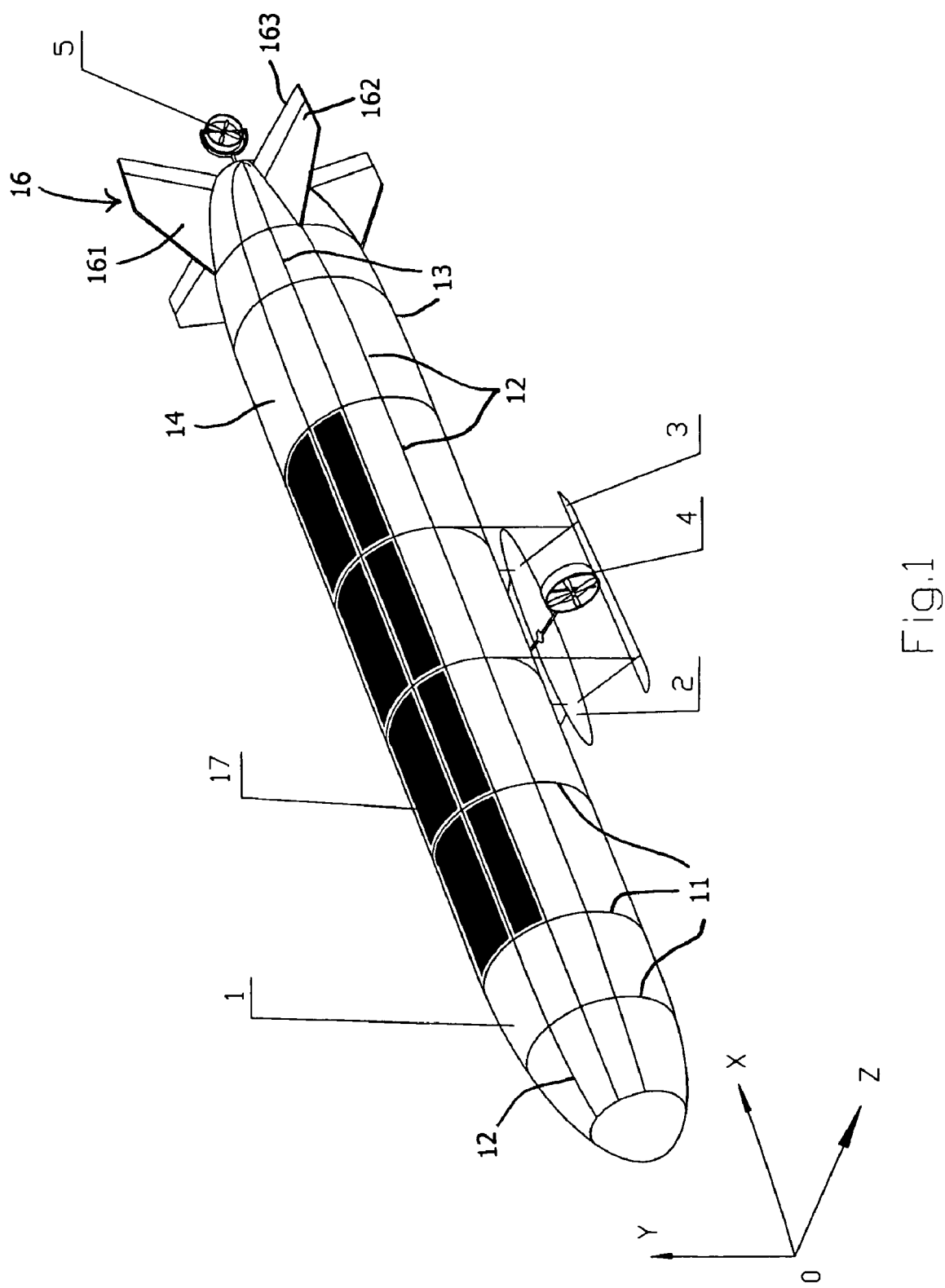
FIG. 1 is an isometric view of a solar-powered transformable airship according to a first embodiment of the present invention.
Figure 2:
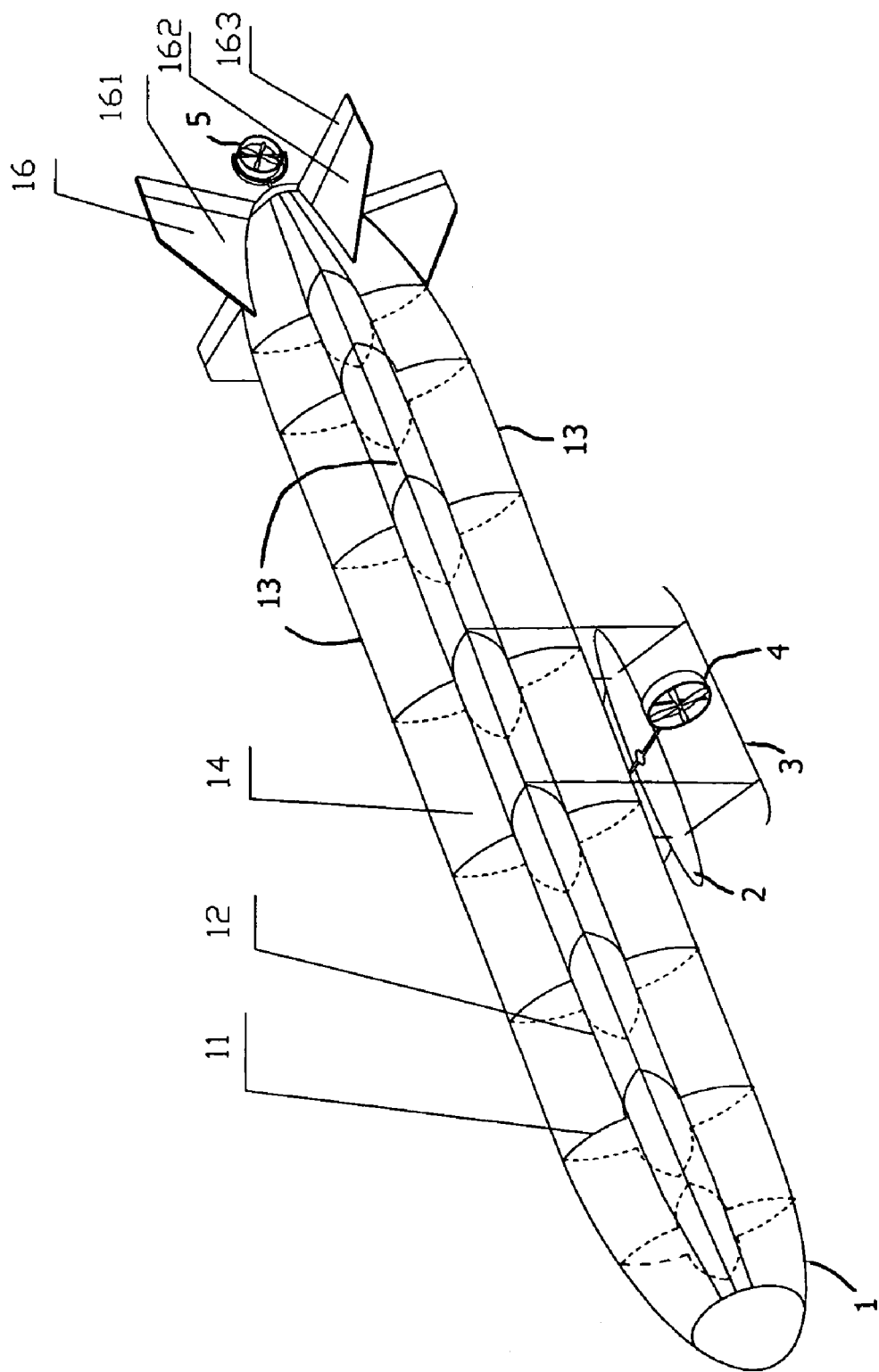
FIG. 2 is an isometric view of the solar powered transformable airship according to the first embodiment of the present invention, wherein the geometry of the airship has been changed.
Figure 3:
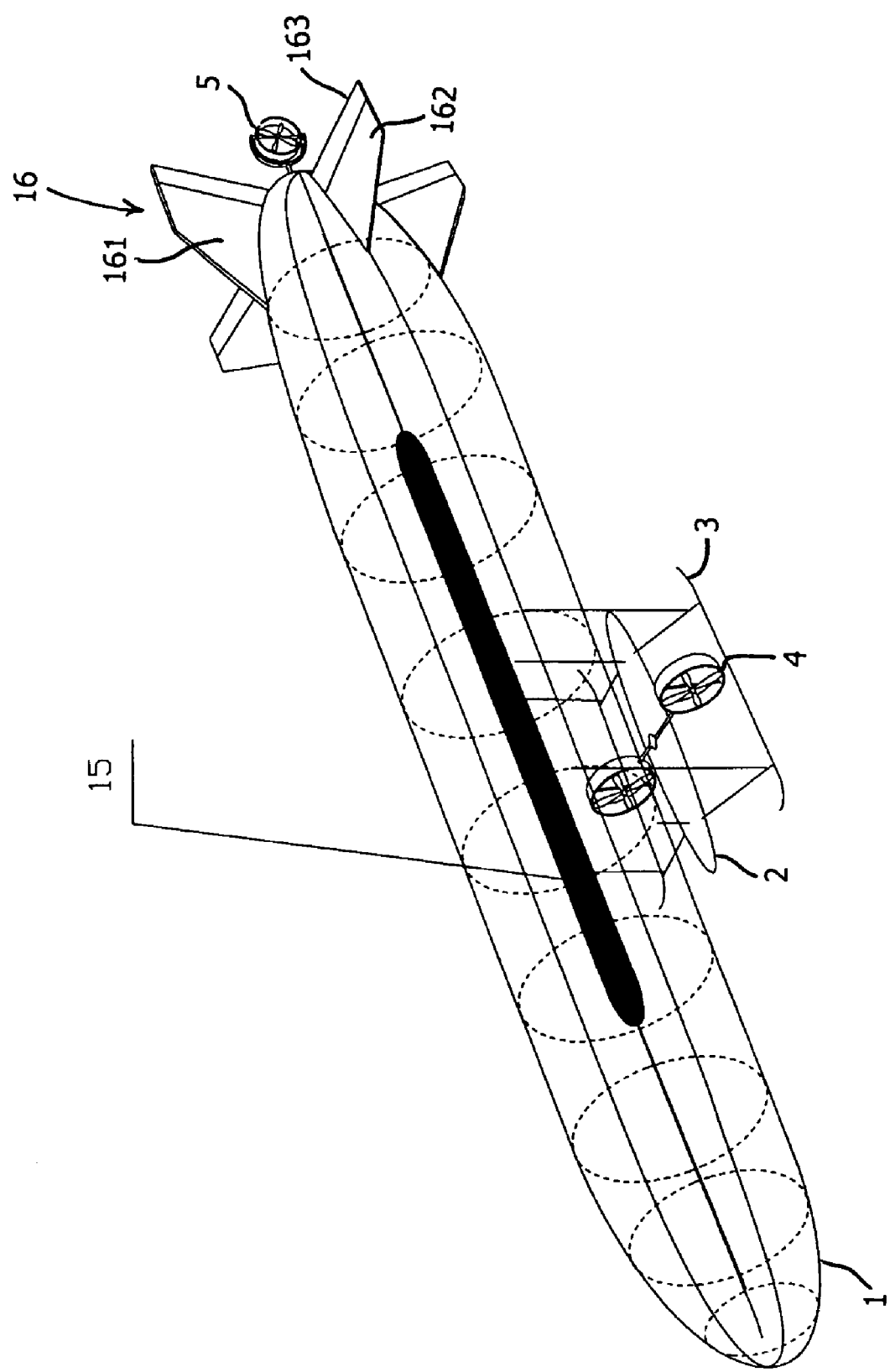
FIG. 3 is an isometric view of the airship illustrating the helium gas storing and discharging apparatus set within the airship in accordance with the first embodiment of the present invention.

A buoyant, e.g. helium, gas storing and discharging apparatus 15 is positioned in the central part inside the airship shell 1 along the longitudinal axis thereof (See FIG. 3).

The airship frame comprises longitudinal frames 12 and 13, radial frames 112 and 113, and reinforcement poles 11 extending circumferentially around the longitudinal axis. Multiple sections of skins 14, made of rigid or weak elastic materials, are mounted on the airship frame, each of the skins 14 is connected with the adjacent skins 14, forming an envelop on the airship frame, wherein each section of said skins 14 has a planar or curved shape, and is connected with a radially adjacent section of skins 14 by a hinge. The reinforcement poles 11 are disposed under the skins 14 and are in the shape of a straight pole or a curved pole conforming to the inner surface of the skins 14, so that the reinforcement poles 11 are conforming to the shape of the airship shell 1. The radial frames and the reinforcement poles have stretchable and movable components, and can be driven to move in a predetermined manner, so that, when buoyancy is to be changed, the buoyant gas is discharged or compressed by the buoyant gas storing and discharging apparatus to produce a pressure difference between inside and outside of the airship shell 1, which generates an outwards or inwards force on the airship skins 14, thus the skins 14 are moved in a manner defined by the moveable frames. As a result, the cross-sectional shape of the airship shell 1 is changed, the volume of the airship is changed, and accordingly the buoyancy is changed.

The control system includes:

an operation control system for controlling the movement of the airship;

a transformation control system, which controls the movement of the movable components in the frame;

a pressure sensing and analyzing system for analyzing and monitoring the pressure difference between inside and outside the airship shell 1, which includes several pressure sensors positioned in the interior and on the outer surface of the airship shell 1; and a buoyant, e.g. helium, gas storing and discharging control system, under the control of which, the buoyant gas can be compressed into the buoyant gas storing and discharging apparatus 15, or can be released into the inner cavity of the airship shell 1 from the buoyant gas storing and discharging apparatus 15.

The solar energy apparatus includes solar cell panels 17 which can be positioned on the outer surface of the entire airship shell 1 or on the outer surface of partial skins 14 of the airship.

The buoyant gas storing and discharging apparatus 15 is positioned in the central part inside the airship shell 1, and is combined with the longitudinal components of the airship frame.

The equipment cabin 2, the skis 3 and the main propellers 4 are positioned under the airship shell 1, while a cross type tail fin 16 and a tail propeller 5 are positioned at the tail end of the airship shell 1. The cross type tail fin 16 is composed of a vertical stabilizer 161, a horizontal stabilizer 162, and an elevator 163.

The longitudinal frames comprise joists 12 and trussed beams 13; the radial frames comprise extendable rod 112 and fixed rod 113; the reinforcement poles 11, conforming to the surface of the airship, are composed of multiple groups of foldable spacing frames extending circumferentially around the longitudinal axis of the airship shell 1. The rigid or weak elastic skins 14 are flexibly hinged with the joists 12 and the trussed beams 13 along the longitudinal direction. A central strengthened component 111 is positioned in the center of the foldable spacing frame 11. When maximized, the cross-section of the airship shell 1 is in the shape of a circle, while the foldable spacing frames, i.e. reinforcement poles 11, are also spread into a circle, and each group of the foldable spacing frames 11 is constructed of sixteen sections of curved poles joined side-by-side, with eight joists 12 and eight trussed beams 13 alternately positioned there between. There are eight radial frames, with four stretchable rods 112 and four fixed rods 113 alternately disposed, wherein one end of the radial frame is connected with the trussed beam 13, the other end is connected with the central strengthened component 111. There are multiple groups of skins 14 along the longitudinal axis, each group is composed of sixteen connected sections of rigid or weak elastic skins 14, forming an envelop on the airship frame 1. The cross-section of the airship is reduced in the following steps: from a circle (FIG. 4c) to a four-petal flower-like shape (FIG. 4b) and then to a four square-star-like shape (FIG. 4a).

Figure 4C:
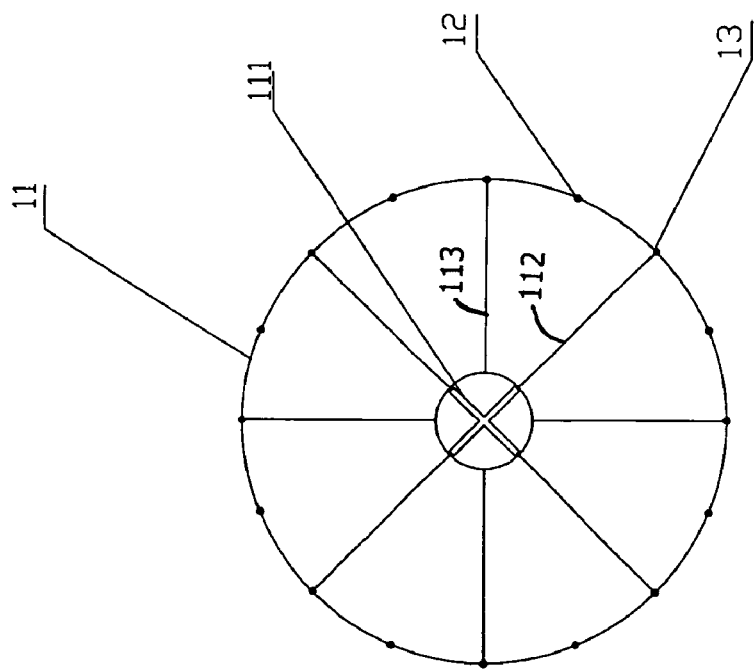
FIGS. 4a, 4b, and 4c are cross-sectional views showing the folding process of the foldable frame of the airship in accordance with the first embodiment of the present invention.
Figure 4B:
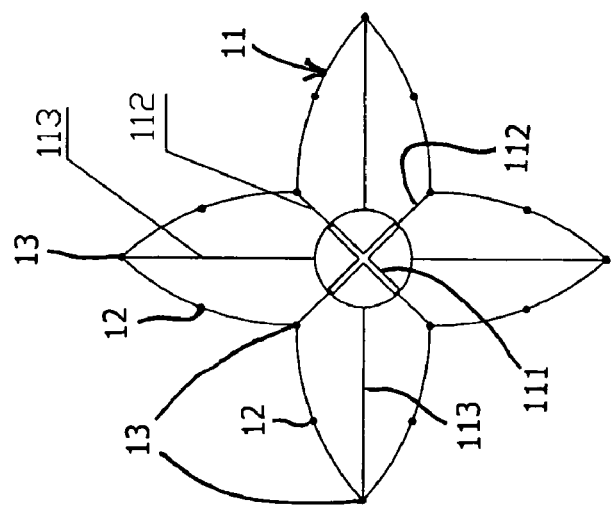
Figure 4A:
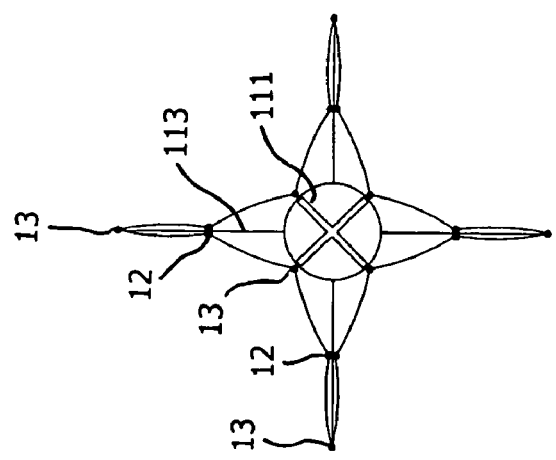

The control method for the take-off of the solar-powered transformable airship comprises the following steps:

a) The cross-section of the airship is minimized, e.g. FIG. 4a, the compressed helium gas is stored in the buoyant gas storing and discharging apparatus 15, the pressure inside the airship balances that outside the airship, then the airship takes off;

b) With the altitude increasing, the pressure sensing and analysis system senses the pressure difference between the inside and the outside of the airship, and commands and controls the compressed helium gas to be gradually discharged from the buoyant gas storing and discharging apparatus 15 to charge the airship shell 1; at the same time, the pressure difference on the airship skins 14 impels the cross-section of the airship shell 1 to be increased, and the transformation control system assists to control the movement of the movable components, so as to ensure the steady variation of the cross-sectional shape of the airship shell 1, and the pressure inside the airship shell 1 gets balanced with that outside the airship shell 1, whereby the airship continues ascending;

c) With the altitude continuously increasing, the pressure sensing and analysis system continues to sense the pressure difference between the inside and the outside of the airship shell 1, and controls the compressed helium gas to be continuously discharged from the buoyant gas storing and discharging apparatus 15 to charge the airship shell 1; at the same time, the pressure difference on the skins 14 impels the cross-section of the airship shell 1 to be increased (e.g. FIG. 4b), the transformation control system assists to control the continuous movement of the movable components, so as to ensure the steady variation of the cross-sectional shape of the airship shell 1, the cross-section of the airship shell 1 continues to increase isotropically, the pressure inside the airship shell 1 gets balanced with that outside the airship shell 1, and the airship continues ascending;

d) The cross-section of the airship shell 1 becomes a maximum (e.g. FIG. 4c) at a predetermined altitude, and the pressure inside the airship shell 1 is balanced with that outside the airship shell 1, and the airship stops ascending.

The buoyant gas storing and discharging apparatus 15 installed in the airship is used to dispense the buoyant gas, which provides the pressure required to change the volume of the airship, so as to adapt to the pressure demands as the altitude changes. The storing and discharging of the buoyant gas can be controlled by the buoyant gas storing and discharging control system.

In the initial state, the airship has the minimum volume, suitable for aviating at a high speed in a low altitude. The airship of the present invention has better flexibility and wind resistance, and thus can perform the tasks of low speed aircrafts, at a much lower cost.

In addition, the airship and the loaded apparatus can be powered by a hydrogen fuel cell and/or assisted with solar energy cells. The solar energy cell panels 17 can be positioned on the entire outer surface of the airship shell 1.

The main propellers 4 can produce a thrust force along the X direction to increase the aviation speed, and a torque about the Y-axis to alter the aviating direction quickly, as well as a thrust force along the Y direction to increase the rising speed. The tail propeller 5 can produce a thrust force along the Y direction to control pitching, and the thrust force in the z direction to the right or left to control the aviating direction when the airship is suspended in the air, as well as a thrust force in the X direction to push forward.

It can be expected that the volume of the airship can be altered by 6-8 times from the minimum volume to the maximum volume, so that the airship can fly and conduct tasks in any altitude within the predetermined altitude range (for example, from 0 to 30 km altitude). Preferably, the longitudinal components of the airship shell 1 are made stretchable, to improve the airship and enable it to be used for different applications.

In conclusion, by adding pushing and pulling poles, stretchable poles or combinations thereof, various forms of a transformable structure can be derived. The mechanical motions, such as pushing, pulling, and stretching of the poles, can be achieved by utilizing worm wheels and worm gears, pneumatic actuation, hydraulic pressure, and/or electronic motion.

Figure 7C:
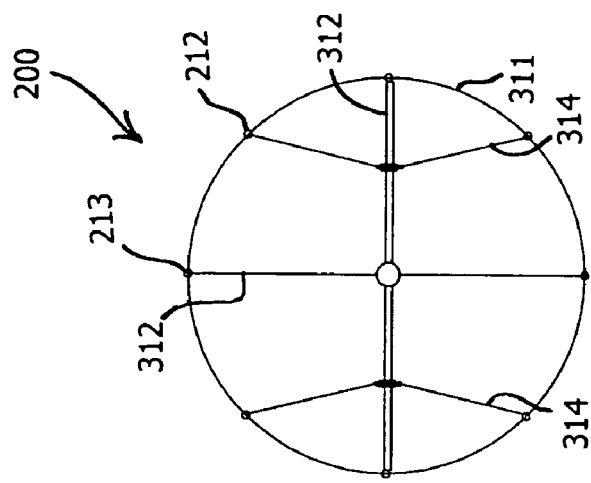
FIGS. 7a, 7b, and 7c are cross-sectional views showing the process of geometry variation of the airship in accordance with a second embodiment of the present invention.
Figure 7B:
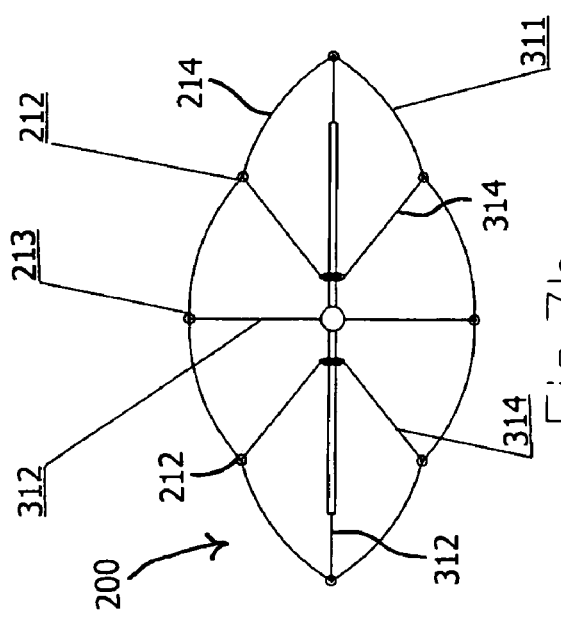
Figure 7A:
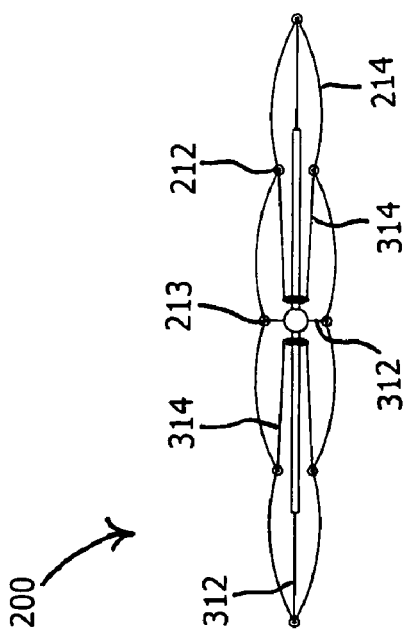

As shown in FIGS. 7a, 7b and 7c, a second embodiment of the present invention includes longitudinal frames comprising joists 212 and trussed beams 213; radial frames comprising cross type stretchable rods 312 and slidable rods 314 extending axially and symmetrically about the longitudinal central axis; and reinforcement poles conforming to the surface of the airship shell 200 is composed of multiple groups of foldable spacing frames 311 generally perpendicular to and surrounding the longitudinal axis. The rigid or weak elastic skin 214 is flexibly hinged with the joist 212 and the trussed beam 213 along the longitudinal direction. When maximized, the cross-section of the airship is in the shape of a circle (FIG. 7c), while the foldable spacing frame 311 is also spread into a circle, and each group of the foldable spacing frames 311 is constructed of eight sections of curved poles joined side-by-side, with four joists 212 and four trussed beams 213 alternately positioned there between. One end of the slidable rods 314 is fixed to a joist 212, and the other end is moveably connected to the middle part of the stretchable rod 312, which can slide along the stretchable rod 312. There are multiple groups of skins 14 along the longitudinal axis, each group is composed of eight connected sections of rigid skins 14, forming an envelop on the airship shell 200. The cross-section of the airship is reduced in the following steps: from a circle (FIG. 7c) to American-football-like shape (FIG. 7b) then to a flat-lotus-root-like shape (FIG. 7a).

When shrunk into a flat shape, the solar-powered transformable airship of the present invention can fly calmly and limit radar reflection.

Figure 8C:
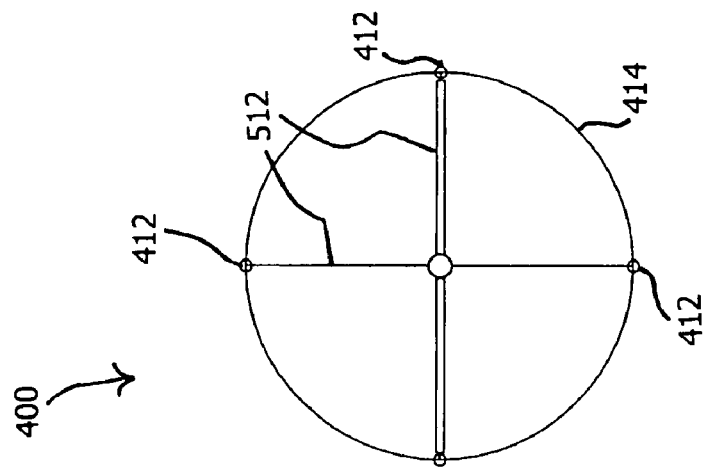
FIGS. 8a, 8b, and 8c are cross-sectional views showing the process of geometry variation of the airship in accordance with a third embodiment of the present invention.
Figure 8B:
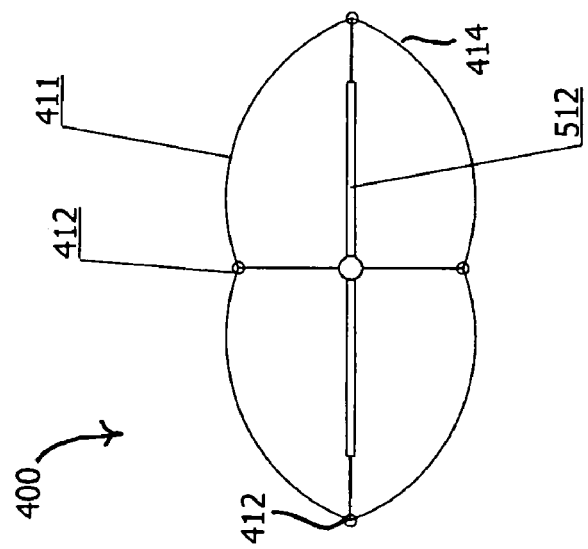
Figure 8A:
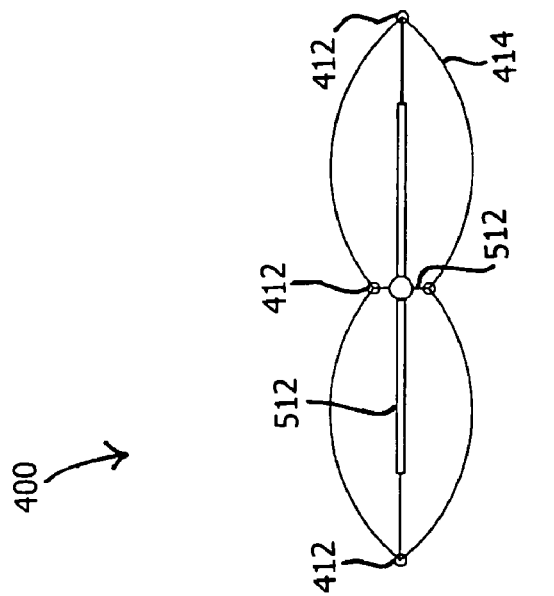

As shown in FIGS. 8a, 8b and 8c, in a third embodiment, the longitudinal frames comprise joists 412; the radial frames comprise cross type stretchable rods 512; the reinforcement poles conforming to the surface of the airship 400 is composed of multiple groups of foldable spacing frames 411 generally perpendicular to and surrounding the longitudinal axis. The rigid or weak elastic skin 414 is flexibly hinged with the joist 412 along the longitudinal direction. When maximized, the cross-section of the airship shell 400 is in the shape of a circle (FIG. 8c), while the foldable spacing frame 411 is also spread into a circle, and each group of the foldable spacing frames 411 is constructed by four sections of curved poles joined side-by-side. One end of each stretchable rod 512 is connected with the node between the joists 412, the other end is fixed to the center part of the airship. There are multiple groups of skins 414 along the longitudinal axis, each group is composed of four connected sections of rigid or elastic skins 414, forming an envelop on the airship shell 400. The cross-section of the airship is reduced in the following steps: from a circle (FIG. 8c) to lip-like shape (FIG. 8b) and then to a double-American-football-like shape (FIG. 8a).

Figure 9C:
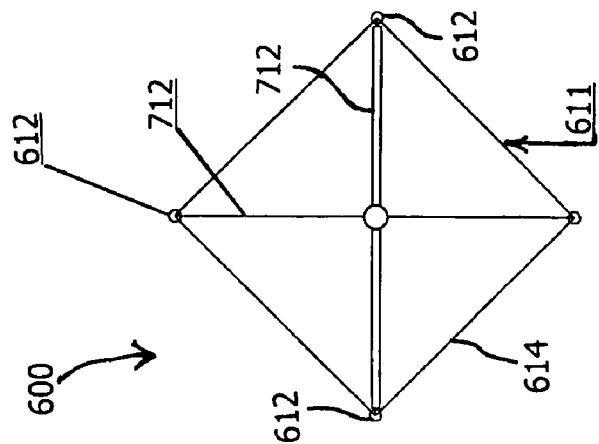
FIGS. 9a, 9b, and 9c are cross-sectional views showing the process of geometry variation of the airship in accordance with a fourth embodiment of the present invention.
Figure 9B:
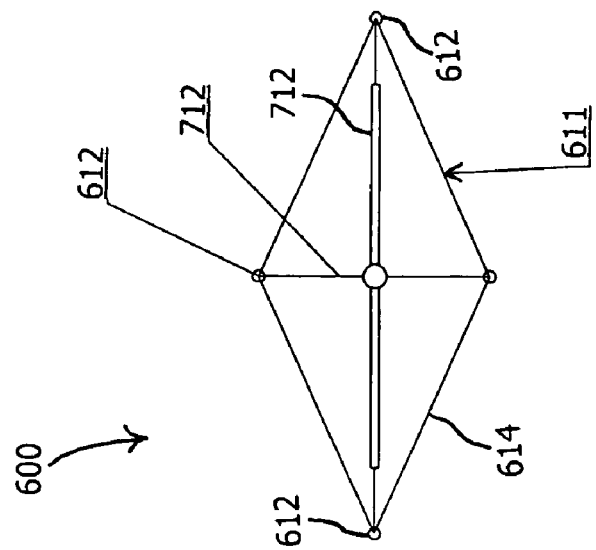
Figure 9A:
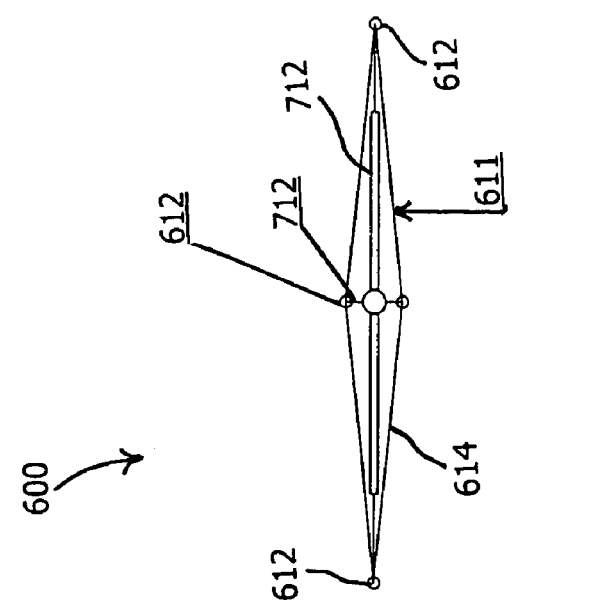

As shown in FIGS. 9a, 9b and 9c, in a fourth embodiment, the longitudinal frames comprise joists 612; the radial frames comprise cross type stretchable rods 712; the reinforcement poles conforming to the surface of the airship 600 is composed of multiple groups of foldable spacing frame 611 vertical to the longitudinal axis. The rigid or weak elastic skin 614 is flexibly hinged with the joist 612 along the longitudinal direction. When maximized, the cross-section of the airship shell 600 is in the shape of a square, while the foldable spacing frame 611 is also spread into a square, and each group of the foldable spacing frames 611 is constructed by four sections of straight poles joined side-by-side. One end of the stretchable rods 712 is connected with a corner point of the airship's cross-section, the other end is fixed to the center part of the airship 600. There are multiple groups of skins 614 along the longitudinal axis, each group is composed of four connected sections of rigid or weak elastic skins 614, forming an envelop on the airship shell 600. The cross-section of the airship shell 600 is reduced in the following steps: from a square (FIG. 9c) to a rhombus-like shape (FIG. 9b) and then to a flat-rhombus-like shape (FIG. 9a).

Since the buoyancy of the solar-powered transformable airship according to the present invention can be altered by 6-8 times and the volume can be altered by 6-8 times, the demand for various applications can be achieved by compressing the helium gas in the helium gas storing and discharging apparatus 15 by up to eight times. Therefore, a very high strength material is not required for the wall of the helium gas storing and discharging apparatus 15, and the material commonly use in the prior art can be used in the invention satisfactorily.

Although the invention has been described in relation to certain preferred embodiments, it is not limited thereto. Rather, the invention includes numerous other embodiments, which can be improved and changed by those in the art without departing from the spirit and scope of the invention. For example, the idea of varying the geometry the airship shell 1 can be used in the design of a submarine and will be the technical scheme for a new generation of submarines.

What is claimed is:

1. A transformable airship, comprising:
an airship frame, including longitudinal frames and radial frames, wherein said radial frames are axially symmetrical about a longitudinal central axis and are extendable and retractable along a radial direction;
an airship shell mounted on said airship frame, comprising multiple sections of skins, each of said skins is connected with an adjacent skin, forming an envelop on said airship frame;
reinforcement poles substantially perpendicular to the longitudinal axis, said reinforcement poles are disposed under the skins and are conforming to the inner surface of the skins, so that the reinforcement poles are conforming to the shape of said airship shell;
buoyant gas storing and discharging apparatus, which is installed inside the airship shell; and
a control system including an operational control system and a transformation control system,
wherein, under the control of the transformation control system, when buoyancy is to be increased, buoyant gas is discharged by the buoyant gas storing and discharging apparatus, and since the air pressure inside the airship is greater than that outside the airship, the pressure difference on the skins generates an outwards force to expand the airship shell, at the same time said radial frame is pulled and extended outwardly in the radial direction, axially symmetrically about said longitudinal central axis, and the airship frame's radial cross-section is enlarged;
wherein when buoyancy is to be decreased, the buoyant gas is compressed into the buoyant gas storing and discharging apparatus, and since the air pressure inside the airship is less than that outside the airship, the pressure difference on the skins generates an inwards force to contract the airship shell, at the same time said radial frame is contracted inwardly in the radial direction, and the radial cross-section of the airship frame is reduced;
wherein said longitudinal frames comprise joists and trussed beams;
wherein the radial frames comprise extendable rods and fixed rods;
wherein the reinforcement poles conforming to the surface of the airship are composed of multiple groups of foldable spacing frames substantially perpendicular to the longitudinal axis;
wherein said skin is flexibly hinged to the joists and the trussed beams along the longitudinal direction, wherein a central strengthened component is positioned in the center of the multiple groups of foldable spacing frames; and
when maximized, the cross-section of the airship shell is in the shape of a circle, while each group of the foldable spacing frames is also spread into a circle.

2. A transformable airship according to claim 1, wherein a solar power apparatus is mounted on the airship shell.

3. A transformable airship according to claim 1, wherein said control system includes:
an operation control system for the movement of the airship;
a transformation control system for controlling the movement of movable components in the airship frame;
a pressure sensing and analyzing system for analyzing and monitoring the pressure difference between inside and outside the airship, which includes several pressure sensors positioned in the interior and on the outer surface of the airship shell; and
a buoyant gas storing and discharging control system which can control the buoyant gas to be compressed or to be discharged by the buoyant gas storing and discharging apparatus.

4. A transformable airship according to claim 2, wherein said solar power apparatus includes solar cell panels mounted on the outer surface of the entire airship shell.

5. A transformable airship according to claim 2, wherein said solar power apparatus includes solar cell panels mounted on outer surfaces of the airship shell.

6. A transformable airship according to claim 1, wherein said buoyant gas storing and discharging apparatus is positioned in a central part of the airship shell, and is combined with the longitudinal components of the airship frame.

7. A transformable airship according to claim 1, wherein an equipment cabin, skis and a pair of main propellers are positioned under the airship shell, and a tail fin and a tail propeller are positioned in the tail end of the airship shell, wherein said tail fin is composed of a vertical stabilizer, a horizontal stabilizer, and an elevator.

8. A transformable airship according to claim 1, wherein each group of the foldable spacing frames is constructed by sixteen sections of curved poles joined side-by-side, with eight joists and eight trussed beams alternately positioned there between;
- wherein there are eight radial frames, with four extendable rods and four fixed rods alternately disposed, wherein one end of each radial frame is connected with one of the trussed beams, the other end is connected with the central strengthened component;
- wherein there are multiple groups of skins along the longitudinal axis, each group is composed of sixteen connected sections of skins, forming an envelop on the airship frame;

wherein the cross-section of the airship is reduced in the following steps: from a circle to a four-petal flower-like shape and then to a foursquare-star-like shape.

9. A transformable airship, comprising:
- an airship frame, including longitudinal frames and radial frames, wherein said radial frames are axially symmetrical about a longitudinal central axis and are extendable and retractable along a radial direction;
- an airship shell mounted on said airship frame, comprising multiple sections of skins, each of said skins is connected with an adjacent skin, forming an envelop on said airship frame;
- reinforcement poles substantially perpendicular to the longitudinal axis, said reinforcement poles are disposed under the skins and are conforming to the inner surface of the skins, so that the reinforcement poles are conforming to the shape of said airship shell;
- buoyant gas storing and discharging apparatus, which is installed inside the airship shell; and
- a control system including an operational control system and a transformation control system,
- wherein, under the control of the transformation control system, when buoyancy is to be increased, buoyant gas is discharged by the buoyant gas storing and discharging apparatus, and since the air pressure inside the airship is greater than that outside the airship, the pressure difference on the skins generates an outwards force to expand the airship shell, at the same time said radial frame is pulled and extended outwardly in the radial direction, axially symmetrical about said longitudinal central axis, and the airship frame's radial cross-section is enlarged;
- wherein when buoyancy is to be decreased, the buoyant gas is compressed into the buoyant gas storing and discharging apparatus, and since the air pressure inside the airship is less than that outside the airship, the pressure difference on the skins generates an inwards force to contract the airship shell, at the same time said radial frame is contracted inwardly in the radial direction, and the radial cross-section of the airship frame is reduced;
- wherein said longitudinal frames comprise joists and trussed beams;
- wherein the radial frames comprise crossed extendable rods and slidable rods axially symmetrically about the longitudinal central axis;
- wherein the reinforcement poles conforming to the surface of the airship shell are composed of multiple groups of foldable spacing frames substantially perpendicular to the longitudinal axis;
- wherein said skin is flexibly hinged with the joists and the trussed beams along the longitudinal direction; and
- wherein when maximized, the cross-section of the airship is in the shape of a circle, while each group of the foldable spacing frames is also spread into a circle.

10. A transformable airship according to claim 9, wherein each group of the foldable spacing frames is constructed by eight sections of curved poles joined side-by-side, with four joists and four trussed beams alternately positioned there between; wherein one end of each of the slidable rods is fixed to a trussed beams, and the other end is moveably connected to the middle part of one of the extendable rods, for sliding along the extendible rod;
- wherein there are multiple groups of skins along the longitudinal axis, each group is composed of eight connected sections of rigid or weak elastic skins, forming an envelop on the airship shell; and
- wherein the cross-section of the airship is reduced in the following steps: from a circle to American-football-like shape then to a flat-lotus-root-like shape.

11. A transformable airship, comprising:
- an airship frame, including longitudinal frames and radial frames, wherein said radial frames are axially symmetrical about a longitudinal central axis and are extendable and retractable along a radial direction;
- an airship shell mounted on said airship frame, comprising multiple sections of skins, each of said skins is connected with an adjacent skin, forming an envelop on said airship frame;
- reinforcement poles substantially perpendicular to the longitudinal axis, said reinforcement poles are disposed under the skins and are conforming to the inner surface of the skins, so that the reinforcement poles are conforming to the shape of said airship shell;
- buoyant gas storing and discharging apparatus, which is installed inside the airship shell; and
- a control system including an operational control system and a transformation control system,
- wherein, under the control of the transformation control system, when buoyancy is to be increased, buoyant gas is discharged by the buoyant gas storing and discharging apparatus, and since the air pressure inside the airship is greater than that outside the airship, the pressure difference on the skins generates an outwards force to expand the airship shell, at the same time said radial frame is pulled and extended outwardly in the radial direction, axially symmetrical about said longitudinal central axis, and the airship frame's radial cross-section is enlarged;
- wherein when buoyancy is to be decreased, the buoyant gas is compressed into the buoyant gas storing and discharging apparatus, and since the air pressure inside the airship is less than that outside the airship, the pressure difference on the skins generates an inwards force to contract the airship shell, at the same time said radial frame is contracted inwardly in the radial direction, and the radial cross-section of the airship frame is reduced;

wherein said longitudinal frames comprise joists;

wherein the radial frames comprise crossed extendable rods;

wherein the reinforcement poles conforming to the surface of the airship are composed of multiple groups of foldable spacing frames substantially perpendicular to the longitudinal axis;

wherein the skin is flexibly hinged to the joists along the longitudinal direction;

wherein when maximized, the cross-section of the airship shell is in the shape of a circle, while each group of the foldable spacing frames is also spread into a circle.

12. A transformable airship according to claim 11, wherein each group of the foldable spacing frames is constructed of four sections of curved poles joined side-by-side;

wherein one end of the extendible rod is connected with a node between the joists, and the other end is fixed to the center part of the airship;

wherein there are multiple groups of skins along the longitudinal axis, each group is composed of four connected sections of rigid or weak elastic skins, forming an envelop on the airship shell;

wherein the cross-section of the airship is reduced in the following steps: from a circle to lip-like shape and then to a double-American-football-like shape.

13. A transformable airship, comprising:

an airship frame, including longitudinal frames and radial frames, wherein said radial frames are axially symmetrical about a longitudinal central axis and are extendable and retractable along a radial direction;

an airship shell mounted on said airship frame, comprising multiple sections of skins, each of said skins is connected with an adjacent skin, forming an envelop on said airship frame;

reinforcement poles substantially perpendicular to the longitudinal axis, said reinforcement poles are disposed under the skins and are conforming to the inner surface of the skins, so that the reinforcement poles are conforming to the shape of said airship shell;

buoyant gas storing and discharging apparatus, which is installed inside the airship shell; and a control system including an operational control system and a transformation control system, wherein, under the control of the transformation control system, when buoyancy is to be increased, buoyant gas is discharged by the buoyant gas storing and discharging apparatus, and since the air pressure inside the airship is greater than that outside the airship, the pressure difference on the skins generates an outwards force to expand the airship shell, at the same time said radial frame is pulled and extended outwardly in the radial direction, axially symmetrically about said longitudinal central axis, and the airship frame's radial cross-section is enlarged;

wherein when buoyancy is to be decreased, the buoyant gas is compressed into the buoyant gas storing and discharging apparatus, and since the air pressure inside the airship is less than that outside the airship, the pressure difference on the skins generates an inwards force to contract the airship shell, at the same time said radial frame is contracted inwardly in the radial direction, and the radial cross-section of the airship frame is reduced;

wherein said longitudinal frames comprise joists;

wherein the radial frames comprise crossed extendable rods;

wherein the reinforcement poles conforming to the surface of the airship are composed of multiple groups of foldable spacing frames substantially perpendicular to the longitudinal axis;

wherein the skin is flexibly hinged to the joists along the longitudinal direction; and wherein when maximized, the cross-section of the airship shell is in the shape of a square, while each group of the foldable spacing frames is also spread into a square.

14. A transformable airship according to claim 13, wherein each group of the foldable spacing frames is constructed of four sections of straight poles joined side-by-side;

wherein one end of the extendable rods is connected with a corner point of the cross-section of the airship shell, the other end is fixed to the center part of the airship;

wherein there are multiple groups of skins along the longitudinal axis, each group is composed of four connected sections of rigid or weak elastic skins, forming an envelop on the airship shell;

wherein the cross-section of the airship shell is reduced in the following steps: from a square to a rhombus-like shape and then to a flat-rhombus-like shape.

15. A control method for the take-off of a transformable airship as claimed in claim 3, comprising the following steps:

a) a cross-section of the airship is substantially minimized, buoyant gas is stored in a buoyant gas storing and discharging apparatus, the pressure inside the airship balances that outside the airship, and the airship takes off;

b) as the altitude increases, the pressure sensing and analysis system senses the pressure difference between inside and outside the airship, and commands and controls the buoyant gas to be gradually discharged from the buoyant gas storing and discharging apparatus to expand the airship shell; at the same time, the pressure difference on the airship skins expands the cross-section of the airship frame, and the transformation control system assists to control the movement of the movable components, to ensure the steady variation of the cross-sectional shape of the airship shell, and the pressure inside the airship shell gets balanced with that outside the airship shell, thereby causing the airship to continue ascending;

c) as the altitude continuously increases, the pressure sensing and analysis system continues to sense the pressure difference between inside and outside the airship shell, and controls the continuous discharge of buoyant gas from the storing apparatus to expand the airship shell; at the same time, the pressure difference on the skins impels the cross-section of the airship frame to be increased, and the transformation control system assists to control the continuous movement of the movable components, so as to ensure the steady variation of the cross-sectional shape of the airship shell, whereby the cross-section of the airship frame continues to increase isotropically, the pressure inside the airship shell gets balanced with that outside the airship shell, and the airship continues ascending; and d) the cross-section of the airship shell becomes maximized, at a predetermined altitude, the pressure inside the airship shell is balanced with that outside the airship shell, and the airship stops ascending.

* * * * *